Figure 1:
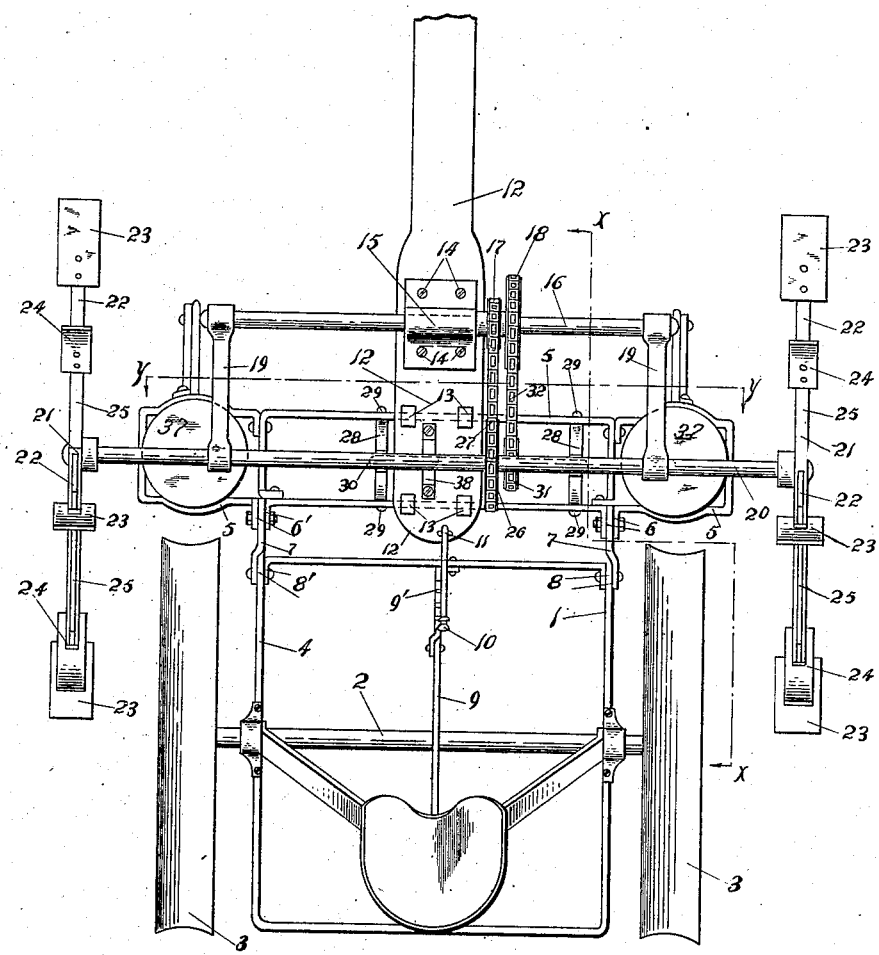

N. C. BRODERSON.
CHECK ROW CORN PLANTER.
APPLICATION FILED JULY 8, 1908.

920,014.

Patented Apr. 27, 1909.
2 SHEETS—SHEET 1.

Witnesses:
Darwin Seymour
Wm. C. Smith

Inventor:
Nathan C. Broderson.
By Joshua R. H. Potts
Atty.

N. C. BRODERSON.
CHECK ROW CORN PLANTER.
APPLICATION FILED JULY 8, 1908.

920,014.

Patented Apr. 27, 1909.
2 SHEETS—SHEET 2.

Witnesses:

Inventor:
Nathan C. Broderson
By Joshua R. H. Potts,
Atty.

UNITED STATES PATENT OFFICE.

NATHAN C. BRODERSON, OF SYCAMORE, ILLINOIS.

CHECK-ROW CORN-PLANTER.

No. 920,014.          Specification of Letters Patent.          Patented April 27, 1909.

Application filed July 8, 1908. Serial No. 442,499.

*To all whom it may concern:*

Be it known that I, NATHAN C. BRODERSON, a citizen of the United States, residing at Sycamore, county of Dekalb, and State of Illinois, have invented certain new and useful Improvements in Check-Row Corn-Planters, of which the following is a specification.

My invention relates to corn-planters, and more particularly to that class known as check-row corn-planters.

The object of my invention is to provide a check-row attachment for planters of the character mentioned, which will dispense entirely with the use of wire or other like contrivances for checking the corn in rows when planting, the latter although very awkward and not easily operated being nevertheless a necessity in corn-planters in general use at the present time; and to accomplish the same result just as efficiently by providing a simple and easily operated check-row mechanism which may be made to form an attachment for, or be manufactured simultaneously with, the corn-planters in general use at present.

A further object of my invention is to provide a check-row attachment for planters of the character mentioned, which will readily accommodate itself to the nature of the ground upon which it operates, being free to raise and lower independently of the seed planting portion of the device, but positively and operably connected to the seed planting mechanism so as to accurately actuate the same.

A further object of my invention is to provide a device of the class mentioned equipped with means for raising the corn planting mechanism and the check-row device simultaneously.

A further object of my invention is to provide a device as mentioned which will be strong, durable, and as stated, of simple construction, hence of low cost to manufacture.

Other objects will appear hereinafter.

With these objects in view my invention consists generally in a frame mounted upon draft wheels, in combination with a runner or seed planter frame hingedly connected thereto, seed dropping mechanism arranged on the last said frame, a rotary shaft mounted thereon for actuating said mechanism, second shaft rotatably mounted on said frame and operably connected with the first said shaft, a pair of arms pivotally mounted on the last said shaft, a marker shaft rotatably mounted in the free ends of said arms and operably connected with the last said shaft and marker wheels on the ends of said marker shaft.

My invention further consists in a corn planter characterized as mentioned in combination with means on the main frame for raising the seed planter frame, and a bracket on said seed planter frame adapted to engage the marker shaft when the former is raised, to raise the marker wheels out of contact with the ground.

My invention further consists in certain details of construction and arrangements of parts all as will be hereinafter fully described and particularly pointed out in the claims.

Figure 2:
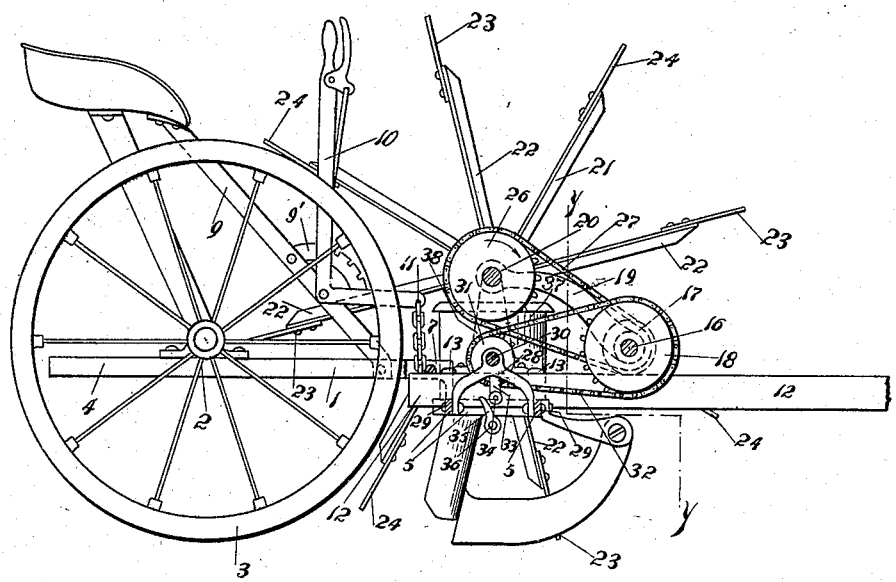
Figure 3:
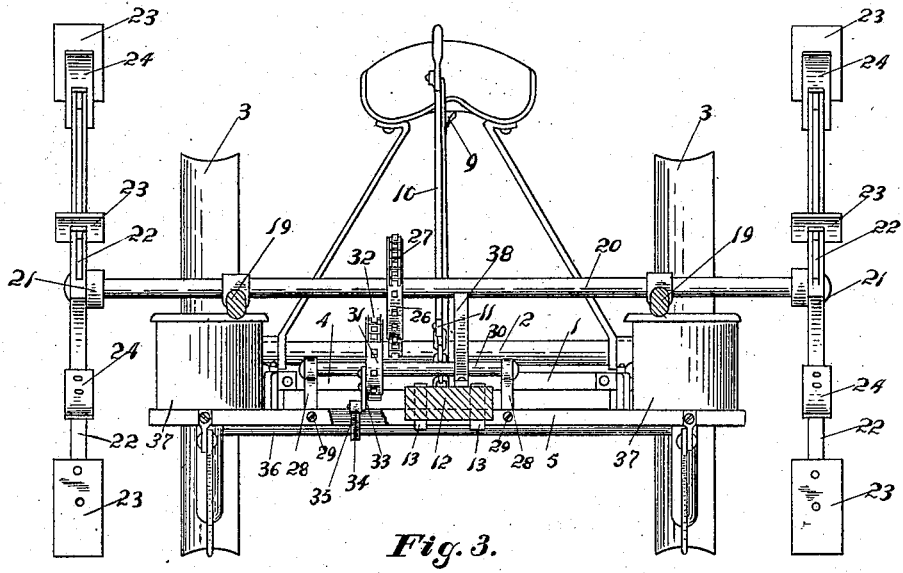

My invention will be more readily understood by reference to the accompanying drawings forming a part of this specification, and in which, Figure 1 is a top plan view of a corn-planter provided with the preferred form of my check-row mechanism, Fig. 2 is a vertical longitudinal section of the same taken on the line $x$—$x$ of Fig. 1, and Fig. 3 is a vertical transverse section taken substantially on the line $y$—$y$ of Fig. 1.

Referring now to the drawings, 1 indicates the ordinary frame of a corn-planter, and 2 the draft-wheel axle to which it is suitably secured, 3 indicating the ordinary draft-wheels rotatably mounted upon said axle. Said framing 1 is composed as is usual, of the rearward stationary frame 4 and the forward vertically adjustable runner frame 5, the latter frames being hinged as at 6 and 6' to the forward end portions of hinge bars or members 7, the rearward end portions of said hinge members being hinged as at 8 and 8' to the stationary frame 4. So as to facilitate vertical adjustment of the runner frame 5 as stated, the frame 4 is provided with an obliquely disposed member 9, to which is secured a segmental rack 9' and to which is fulcrumed the bell crank hand lever 10, said lever being provided with an ordinary pawl which is adapted to engage the notches in said segmental rack so as to hold the runner frame in adjusted position, and the forward end 11 of said lever being suitably secured as by a chain to the rearward end portion of the draft-tongue 12, said rearward end portion of said tongue being suitably secured as by iron bands 13 to the runner frame 5. By this arrangement it is obvious that the runner frame may be easily and readily adjusted by the operator.

Suitably secured as by screws 14 to the tongue 12 is a shaft supporting bracket member 15. Mounted or journaled in said bracket member 15 is a horizontally disposed rock-shaft 16. Rotatably mounted or journaled substantially centrally upon said rock-shaft and locked together upon the same, are sprocket wheels 17 and 18. Suitably secured to either end of said rock-shaft 16 is a floating shaft supporting member or arm 19. Rotatably mounted or journaled in said members 19 and positioned preferably directly above the seed-boxes of the planter, is a horizontally disposed shaft 20, fixed to either end of which is a spade marker-wheel 21, each of said wheels being preferably composed, as shown in the accompanying drawings, of eight spade marking arms 22, alternate arms of the same being provided at their outer ends with spades 23 of a greater width than spades 24 secured to the ends of the arms 25 intermediate of said arms 22, as clearly shown in the accompanying drawings and for a purpose hereinafter set forth. Suitably fixed as by a key to said spade marker-shaft 20 in alinement with the sprocket wheel 17, is a sprocket wheel 26. Connecting said sprocket wheels 26 and 17 is a sprocket chain 27. Journaled in brackets 28, said brackets being suitably secured as by bolts or rivets 29 to the runner frame 5, is a horizontally disposed shaft 30. Fixed to said shaft in alinement with said sprocket wheel 18 is a sprocket wheel 31. Connecting said sprocket wheels 18 and 31 is a sprocket chain 32. Secured to the side of said sprocket wheel 31 and projecting radially therefrom, is a tappet 33. Said tappet 33 is provided with a roller 34 as clearly shown in Fig. 3 of the accompanying drawings. Said roller 34 of the tappet 33 is adapted when the gear-wheel 31 is rotated to rock or trip a trigger 35 fixed to a rock-shaft 36, said shaft being adapted when so operated to actuate the seed-dropping mechanism of the seed-boxes 37, said boxes being of any ordinary or preferred form.

The sprocket wheels 31 and 17 are preferably made half as large as the sprocket wheels 18, and 26, that is the former are provided with half as many teeth as the latter, and the spade marker-arms made of such a length that the distance between two adjacent spade edges is preferably 21 inches. With this arrangement it is obvious that the sprocket wheel 31 will revolve four times while the spade marker-wheels revolve but once, and since the spades are 21 inches apart and there are eight of said spade arms, seeds will be dropped every 42 inches, which is the usual distance between rows of corn. It is to be understood however that said sprocket wheels may be proportioned differently than mentioned, and that said spade marker-arms made of a shorter or longer length than mentioned so as to alter the distance between rows of seeds when planting as desired, without departing from the spirit of my invention.

To facilitate elevating the spade marker wheels out of contact with the ground when transporting the planter from field to field, or when turning at the ends of rows, I provide a bracket member 38, the same being positioned directly under the spade marker-shaft 20 and suitably secured preferably by screws as shown in the drawings to the upper surface of the tongue 12. With this arrangement when the runners or furrowers which are secured to the runner frame 5 of the machine, are raised, the same being necessary when transporting the machine or when turning, by the hand-lever 10, the bracket member 38 will obviously be raised simultaneously with said frame, and which in turn will raise the spade marker-shaft and wheels from contact with the ground, thus obviating the necessity of any extra levers for performing this function, the one ordinary runner frame vertically adjusting lever doing the work that otherwise would employ the use of two levers to perform.

In operating a machine provided with my attachment, that is, in planting corn, the machine is drawn over the field as usual. The spades 23 and 24 of the spade marker-wheels 21 being supported in floating supporting members will rest or obviously step along the ground leaving alternating long and short marks on the ground passed over. In returning that is, in drawing the machine in the opposite direction after having finished planting a row of seeds, the operator may readily check the rows of seed by steering the machine when driving so that the wide spade will register with the long marks, and the narrow spades with the short marks previously made on the ground when driving in the opposite direction, thus facilitating easily and accurately checking of the rows of seeds planted.

Having described my invention what I claim as new, and desire to secure by Letters Patent, is:

1. In a device of the class described, a main frame mounted upon wheels, in combination with a seed planter frame hingedly connected thereto, said seed planter frame being provided with seed hoppers and seed dropping mechanism, a shaft mounted on the last said frame and adapted to actuate said mechanism, a second shaft mounted on said frame and operably connected with the first said shaft, a pair of arms pivotally mounted on said second shaft, a marker shaft rotatably mounted in the free ends of said arms, marker wheels on the ends of said shaft and gearing connecting said marker shaft and said second shaft, substantially as described.

2. In a device of the class described, a main frame mounted upon wheels, in combination with a seed planter frame, a pair of links hingedly connecting said frames, means on said main frame for raising said seed planter frame, a floating frame pivotally connected to said seed planter frame and arranged above the same seed dropping mechanism, a check-row marker carried by said seed planter frame and adapted to actuate said seed dropping mechanism and means on said seed planter frame for engaging said floating frame as the former is raised for raising said marker, substantially as described.

3. In a device of the class described, a main frame mounted upon wheels, in combination with a seed planter frame hingedly connected thereto, said planter frame being provided with seed hoppers and seed dropping mechanism, a shaft mounted on said planter frame, a sprocket wheel on said shaft, means on said sprocket wheel for actuating said seed droppping mechanism, a second shaft mounted on said planter frame, a pair of arms pivotally mounted on said second shaft, a marker shaft rotatably mounted a sprocket on said shaft, a pair of sprockets on said second shaft, chains connecting the last said sprockets with the sprockets on the first said shaft and said marker shaft respectively, and marker wheels on said marker shaft, substantially as described.

In testimony whereof I have signed my name to this specification in the presence of two subscribing witnesses.

NATHAN C. BRODERSON.

Witnesses:
    CHAS. A. KING,
    CHRISTIAN F. BOYSEN.